No. 861,303. PATENTED JULY 30, 1907.
G. H. MORSE.
CALCULATING MACHINE.
APPLICATION FILED MAR. 8, 1906.
2 SHEETS—SHEET 1.
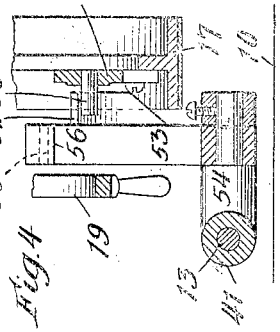
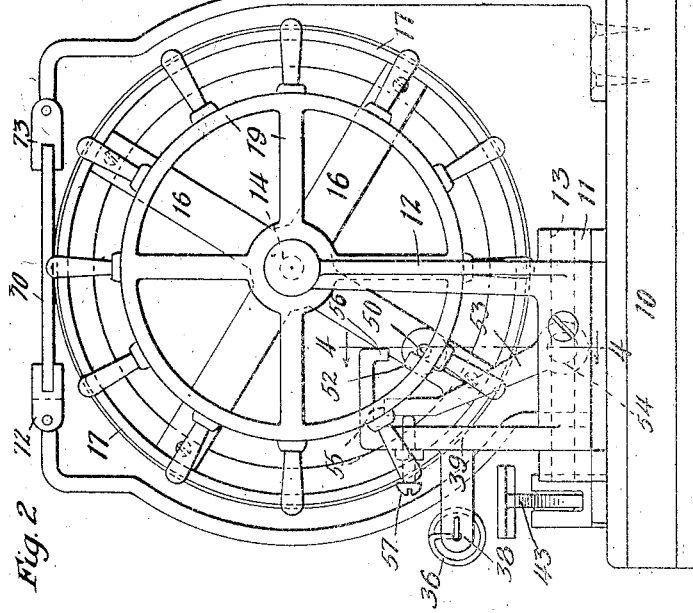
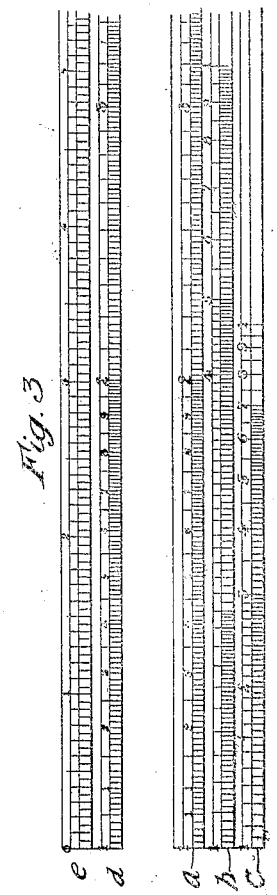
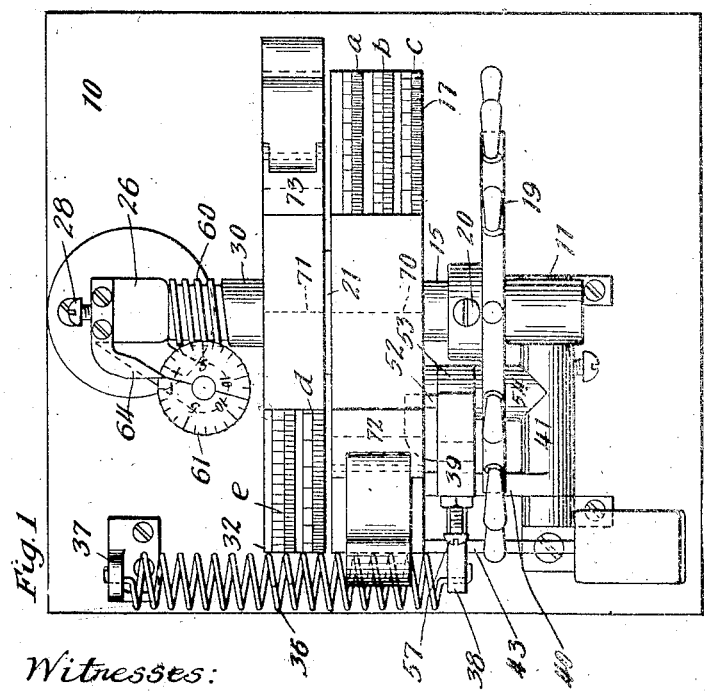
Witnesses:
Wm. Geiger
A. W. Munday
Inventor
George H. Morse

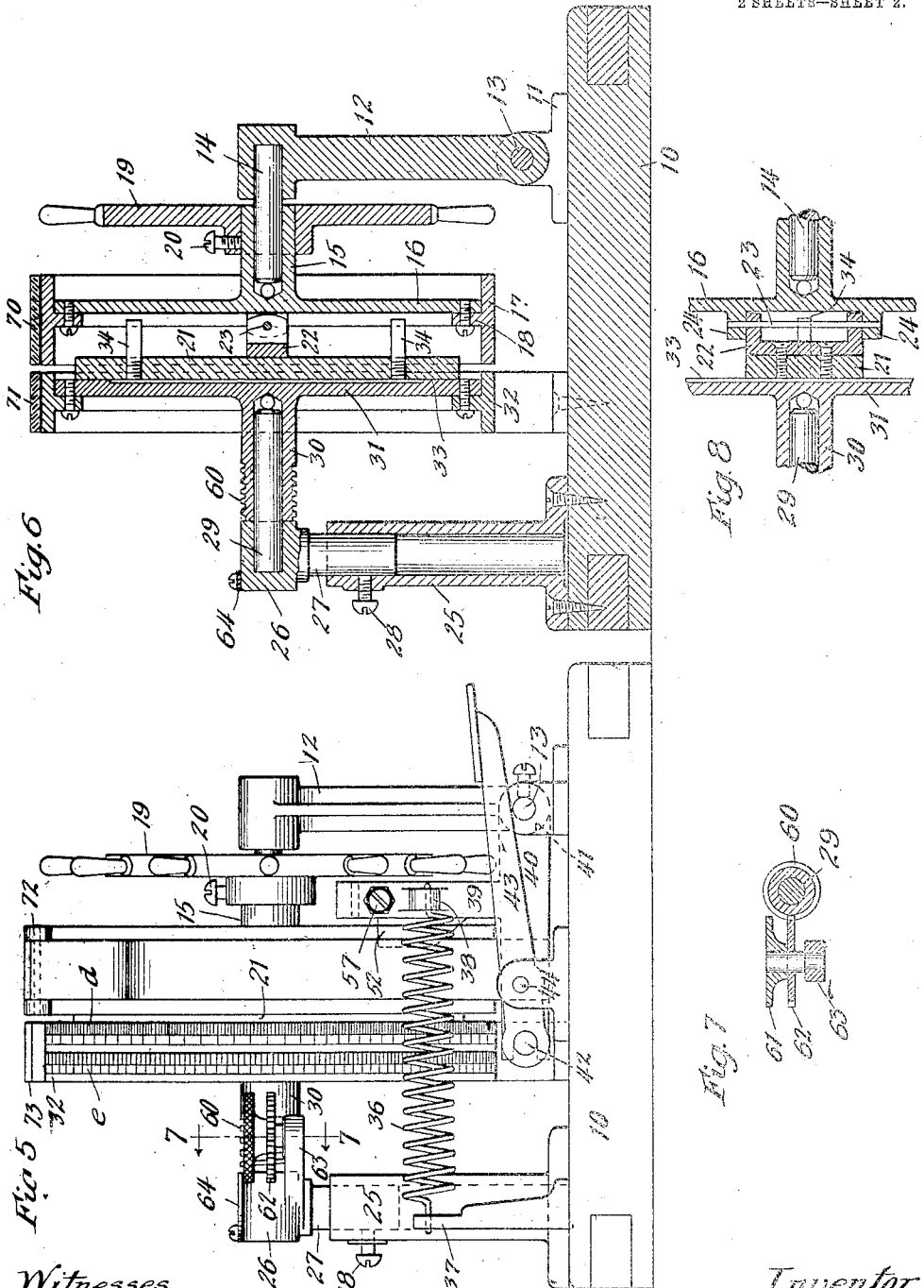

UNITED STATES PATENT OFFICE.

GEORGE H. MORSE, OF LINCOLN, NEBRASKA.

CALCULATING-MACHINE.

No. 861,803.    Specification of Letters Patent.    Patented July 30, 1907.

Application filed March 3, 1906. Serial No. 304,856.

*To all whom it may concern:*

Be it known that I, GEORGE H. MORSE, a citizen of the United States, residing in Lincoln, in the county of Lancaster and State of Nebraska, have invented a new and useful Improvement in Calculating-Machines, of which the following is a specification.

This invention relates to calculating machines employing the principle of the slide rule.

It embodies two companion wheels revolving side by side about a common axis and carrying on their rims appropriate coöperating scales. One of the wheels is adapted to be operated by hand in either direction, and the other is driven frictionally by this hand wheel, the frictional contact between the wheels being made and broken whenever desired. I prefer to mount the wheels upon separate shafts arranged in line with each other and also to effect the making and breaking of the friction contact by supporting the shaft of the hand operated wheel so it may be tipped toward or away from the companion wheel. With these wheels I also employ an index or decimal point wheel adapted to indicate the proper point for the placing of the decimal point in the result of the calculation. The nature of this wheel is fully explained in the description given below.

The invention also embodies other features of invention and the nature thereof, as well as the mode of use of the invention are fully described below and will be readily understood from such description, when considered in connection with the accompanying drawings.

In said drawings, Figure 1 is a plan view of the invention. Fig. 2 is an end elevation. Fig. 3 is a partial plan of the rims of the scale wheels. Fig. 4 is a detail section on the line 4—4 of Fig. 2. Fig. 5 is a front elevation. Fig. 6 is a longitudinal vertical section. Fig. 7 is a detail section on the line 7—7 of Fig. 5 and Fig. 8 is an enlarged partial section of the scale wheels.

In said drawing, 10 represents the base of the machine, and 11 is a bearing mounted on said base and supporting a standard 12 pivotally united to the bearing by a pivot 13, such pivot being horizontally arranged transversely of the axis of the scale wheels. In the upper end of the standard 12 is a recess supporting a stub shaft 14. This stub shaft projects into the hub 15 of that one of the scale wheels which is actuated by hand when making calculations. This wheel is composed of a metallic spider 16, and a rim 17 preferably made of celluloid and carrying the scales hereinafter more particularly described. For uniting the spider to the celluloid rim, the latter is provided with an inward flange 18 adapted to be bolted to the arms of the spider. Upon the hub 15 is mounted the pilot or operating wheel 19, which is rigidly secured to the hub by a set screw 20. The wheel 16, 17 is provided with a rocking friction device 21 consisting of a block of wood attached to a holder 22, preferably made in U shape and supported upon a pivot 23, the ends of which are carried in ears 24 projecting from the central portion of the spider 16 at opposite sides of the axis. This construction permits the friction block 21 to accommodate itself to the opposing friction surface with which it is brought in contact, and thus to equalize the pressure between its ends exerted by the friction block upon said opposing surface. The friction block 21 is provided with a pair of pins 34 projecting backward from the acting surface of the block and adapted to limit the rocking movements of the block by their contact with the face of the spider 16.

At 25 is a hollow post or standard also attached to said base 10 and in this post a bearing 26 is supported, the bearing having a depending lug 27 fitting in the post and adapted to be secured therein at the proper height by a set screw 28, the bearing being removable by releasing the set screw. The bearing 26 receives a stub axle 29 which projects into the hub 30 of another spider 31 supporting a celluloid rim 32 carrying scales and forming the other scale wheel. The construction of this spider and rim is substantially the same as that of the wheel 16 and 17, except that in the case of the wheel 31, 32, the friction device is formed directly upon the spider 31, being in the nature of a circular rim connecting the ends of the spider arms, and the celluloid rim is somewhat narrower than that of the other wheel. The friction surface of the spider 31 which opposes the friction block 21 is shown at 33.

The wheel 16, 17 is normally held with its friction block in contact with the friction surfaces 33 of the other wheel by a spring 36, one end of which is attached to a standard 37 rising from the base, and the other end of which is attached to an arm 38 projecting from an upright 39 rising from a horizontal arm 40 attached to a sleeve 41 surrounding the pivot 13 and rigid with the hinged standard 12. The arm 40 projects at right angles to the sleeve and its inner end is provided with a fork which is engaged by the stud 42 fixed at the end of a lever 43, pivoted stationarily at 44 and adapted to be depressed by hand. When depressed, the lever through the stud 42 and the sleeve 41 rocks the standard 12 in such manner as to carry the wheel 16, 17 out of action so far as the other wheel is concerned, and by maintaining the pressure on the lever 43, it may be kept out of action, notwithstanding the spring 36, as long as desired, and while so kept out of action, the wheel is of course at liberty to be turned to any extent desired. Upon the release of the pressure on the lever 43, the wheel 16, 17 immediately resumes its frictional contact with the other wheel.

At 50 is shown a laterally projecting pin secured in the scale wheel 16, 17. This pin is adapted to engage a projection 52 rising from the lever 53, which lever is pivotally supported in the right angle extension 54 of the sleeve 41. The projection 52 is adapted to arrest the wheel 16, 17 when the latter arrives at the zero position and is moved in one direction. When the movement of the wheel is in the other direction, the pin strikes the other side of the projection 52 and swings the lever 53 until the top end 55 of said lever 53 encounters the overhanging end 56 of the upright 39. This allows the wheels to complete their cycle of movement and results in their being arrested as soon as they have done so. Of course, it will be noted that the end 55 of the lever and the overhanging end of the upright 39 are in the same plane, but that that plane is a different one from that in which the projection 52 travels. The lever 53 adjustably positioned by a set screw 57 passing through the upright 39, as plainly seen at Fig. 2.

It will be noted that a worm 60 is cut upon the hub 30 of the wheel 31 and 32. In close proximity to this worm is an index wheel 61 supported axially in the gear 62 meshing with said worm and having its bearing in the arm 63 projecting from the bearing 26. This wheel rests by gravity in the pinion, and of course turns with the pinion, but it is knurled upon its edge so that it may be turned freely and independently by hand. The top of the wheel 61 is divided into two sets of equal spaces, 12 upon each side. The spaces upon one side of this wheel are plus and those upon the other side are minus, and they in conjunction with the pointer 64 which is stationarily supported from the bearing 26 and projects over the edge of the wheel, as shown at Fig. 1, determine the proper place for the placing of the decimal point in the result of any calculation. The wheel is customarily set before beginning the calculation in accordance with the characteristics of the problem presented. If these characteristics sum up a plus number, then the wheel is turned accordingly to present the plus side to the pointer. If they sum up a minus quantity, then the wheel is turned to the proper point on the minus side and the position of the wheel at the end of the calculation shows the operator where the decimal point should be placed in the result.

The rim of the wheel 16, 17, is customarily provided with three different sets of logarithmic scales, $a$, $b$ and $c$, the scale $a$ extending entirely around the wheel, and the scales $b$ and $c$ extending only a portion of the periphery but being duplicated as often as necessary to enable them to fill the entire circumference. In the wheel 31 and 32, the rim is provided with a scale $d$ corresponding to the scale $a$ of the other wheel and it is also provided with a scale of divisions $e$, dividing the periphery into aliquot parts. The scale wheels are provided with separate glass indicators 70 and 71, indicating the zero position. These indicators are held in position by separate frames 72 and 73.

In the use of the invention, the two wheels are brought to the zero position, and then the first factor in the problem, if it be one of multiplication, is added by moving both wheels counter clockwise in unison until the factor read upon the scale $a$ has reached the zero point. The frictional contact between the wheels is then broken and the wheel 16, 17 is moved back to zero in readiness for the adding of the next factor which is added precisely as the first factor by moving both wheels together counter clockwise until the added factor passes zero. The first wheel being then independently returned to zero, another factor can be added in the same manner and so on. A reverse process serves to subtract the factors or accomplish the act of division. The scales $b$ and $c$ are employed in problems involving the square and cube roots as factors respectively.

I claim:—

1. The combination in a calculating machine, of two companion wheels carrying scales revolving side by side about a common axis but upon separate shafts, the shaft of one wheel being adapted to tip endwise so as to carry its wheel into contact with or away from the other wheel.

2. The calculating machine embodying two companion wheels revolving side by side, one of said wheels being mounted upon an axle adapted to tip so as to carry it toward or away from the other wheel, and being also provided with a friction device adapted to engage the other wheel.

3. The calculating machine embodying two companion wheels revolving side by side, one of said wheels being mounted upon an axle adapted to tip so as to carry it toward or away from the other wheel, and being also provided with a self adjusting friction device adapted to engage the other wheel.

4. The calculating machine embodying two companion wheels mounted side by side upon separate axles and a support the axle of one of said wheels adapted to tip the axle and wheel so as to make and break the contact between the wheels.

5. The computing machine wherein are combined two companion wheels revolving side by side on separate axles, one of said wheels being adapted to be operated by hand, and provided with friction devices whereby it may operate the other wheel, said hand operated wheel being also adapted to be tipped toward or away from the other wheel.

6. The combination in a calculating machine, of two companion wheels revolving side by side upon separate axles, one of the wheels being movable toward and away from the other by a tipping movement of its axle and provided with a rocking friction device 21 adapted to bear upon the other wheel.

7. The calculating machine having two companion wheels revolving side by side about a common axis, one of said wheels being adapted to drive the other at will, said driving wheel being also provided with means for arresting it automatically at the zero position when moved in either direction.

8. The combination in a calculating machine, of two companion scale wheels revolving side by side upon separate axles, one of said wheels being an operating wheel and the other a driven wheel, of a decimal point locating device actuated by said driven wheel.

9. The combination in a calculating machine with the companion scale wheels, of a decimal point locating device.

10. The combination in a calculating machine with the companion scale wheels, of a decimal point locating device controlled automatically by one of said wheels.

11. The combination in a calculating machine with the companion scale wheels, of the decimal point indicating wheel having a worm connection to one of the wheels and a pointer coöperating with said decimal point indicating wheel.

12. The combination in a calculating machine with the companion scale wheels, one of which is the operating wheel and the other a driven wheel, of a decimal point indicating wheel and pointer, said decimal point wheel being actuated from the driven wheel by a worm and gear.

13. The combination in a calculating machine, of the two companion scale wheels, one of which is the operating wheel, and the other a driven wheel, of a worm and pinion actuated by the driven wheel and an indicating wheel actuated by said pinion and a pointer coöperating with said indicating wheel.

14. The combination in a calculating machine with the companion scale wheels, one of which is an operating wheel and the other a driven wheel, of a decimal point indicating wheel actuated from said driven wheel and also adapted to be turned freely by hand.

15. The combination in a calculating machine, of the companion scale wheels, one of which is the operating wheel and the other is driven from the operating wheel, of a decimal point locating wheel and pointer, said decimal point locating wheel having its surface divided into radial spaces, part of which are minus and part plus.

16. The combination in a calculating machine, of two companion wheels carrying scales revolving side by side about a common axis but upon separate shafts, one of said wheels being movable toward and from the other wheel and provided with friction devices adapted to engage the other wheel.

17. The combination in a calculating machine, of two companion wheels carrying scales revolving side by side about a common axis but upon separate shafts, the shaft of one of said wheels being movable endwise so as to carry its wheel into contact or away from the other wheel.

GEORGE H. MORSE.

Witnesses:
O. V. P. STOUT,
A. L. CANDY.